United States Patent
Joensson et al.

(10) Patent No.: US 9,447,131 B2
(45) Date of Patent: Sep. 20, 2016

(54) LIGNOSULFONATE OF A CERTAIN QUALITY AND METHOD OF PREPARATION OF LIGNOSULFONATE OF A CERTAIN QUALITY

(75) Inventors: Bengt Joensson, Solna (SE); Hans Grundberg, Bjästa (SE); Alf Gustafsson, Domsjö (SE)

(73) Assignee: Domsjö Fabriker AB, Örnsköldsvik (SE)

( * ) Notice: Subject to any disclaimer, the term of this patent is extended or adjusted under 35 U.S.C. 154(b) by 643 days.

(21) Appl. No.: 13/516,258

(22) PCT Filed: Dec. 15, 2010

(86) PCT No.: PCT/SE2010/051391
§ 371 (c)(1),
(2), (4) Date: Jul. 16, 2012

(87) PCT Pub. No.: WO2011/075060
PCT Pub. Date: Jun. 23, 2011

(65) Prior Publication Data
US 2012/0267064 A1    Oct. 25, 2012

(30) Foreign Application Priority Data
Dec. 16, 2009   (SE) .................................... 0901569

(51) Int. Cl.
*B01D 61/14*   (2006.01)
*B01D 61/58*   (2006.01)
(Continued)

(52) U.S. Cl.
CPC .............. *C07G 1/00* (2013.01); *B01D 61/142* (2013.01); *B01D 61/58* (2013.01); *D21C 7/08* (2013.01); *D21C 11/02* (2013.01); *D21H 21/18* (2013.01)

(58) Field of Classification Search
CPC .. B01D 61/58; B01D 65/02; B01D 2311/04; B01D 2311/08; B01D 2311/10; B01D 2311/103; B01D 2311/2649; B01D 2311/2673; B01D 2321/14; B01D 2321/32; B01D 2317/025; B01D 2319/025; B01D 61/14; B01D 61/142; B01D 61/145; D21C 1/03; D21C 1/10; D21C 7/00; D21C 7/08; D21C 9/00; D21C 9/18; D21C 9/185; D21C 11/00; D21C 11/0021; D21C 11/02; D21C 11/04; C07G 1/00; D21H 21/18; D21H 21/20; D21D 5/00
USPC ........ 162/14, 16, 17, 29, 32, 36, 42, 51, 62, 162/82-84, 237, 239, 242, 248, 251; 210/636, 641, 770, 771, 806, 774, 182, 210/184, 321.6, 321.72, 335, 259
See application file for complete search history.

(56) References Cited

U.S. PATENT DOCUMENTS 2,801,994 A * 8/1957 Gray et al. .................... 530/500
2,935,504 A * 5/1960 King et al. .................... 530/506

(Continued)

FOREIGN PATENT DOCUMENTS

CA        992266      7/1976
CN    101274947 A    10/2008

(Continued)

OTHER PUBLICATIONS

International Preliminary Report on Patentability Corresponding to International Application No. PCT/SE2010/051391; Date of Mailing: Jun. 28, 2012; 8 Pages.

(Continued)

*Primary Examiner* — Joseph Drodge
(74) *Attorney, Agent, or Firm* — Myers Bigel & Sibley, P.A.

(57) ABSTRACT

There is provided a process for improving the quality of lignosulfonate at least partly derived form a spent sulfite cooking liquor in at least two steps, comprising: one step in which a lignosulfonate-containing fraction at least partly derived from the spent sulfite cooking liquor is subjected to filtration using a membrane having a cut-off of 40-150 kD (high cut-off) at the pressure, flow rate and temperature of the step and the permeate is recovered; and another step in which a lignosulfonate-containing fraction at least partly derived from the spent sulfite cooking liquor is subjected to filtration using a membrane having a cut-off of 1-20 kD (low cut-off) at the pressure, flow rate and temperature of the step and the retentate is recovered. Products, uses thereof as well as a system are also provided.

6 Claims, 3 Drawing Sheets

(51) Int. Cl.

| | |
|---|---|
| D21C 11/00 | (2006.01) |
| D21H 21/18 | (2006.01) |
| D21D 5/00 | (2006.01) |
| C07G 1/00 | (2011.01) |
| D21C 11/02 | (2006.01) |
| D21C 7/08 | (2006.01) |

(56) References Cited

U.S. PATENT DOCUMENTS

| | | | | |
|---|---|---|---|---|
| 3,079,353 | A | * | 2/1963 | Goss .................... 527/400 |
| 3,737,551 | A | * | 6/1973 | Karsten et al. ........... 514/483 |
| 4,151,207 | A | | 4/1979 | Evju |
| 4,293,459 | A | * | 10/1981 | Detroit .................... 524/76 |
| 4,450,106 | A | * | 5/1984 | Forss ..................... 530/500 |
| 4,499,117 | A | * | 2/1985 | Bonneau ................. 426/592 |
| 4,631,129 | A | | 12/1986 | Heikkila |
| 4,892,588 | A | * | 1/1990 | Dilling et al. .......... 106/501.1 |
| 4,908,098 | A | * | 3/1990 | DeLong ................ C08H 6/00 162/16 |
| 5,110,414 | A | * | 5/1992 | Forss .................. C08L 97/02 162/11 |
| 5,250,182 | A | * | 10/1993 | Bento et al. ............ 210/641 |
| 5,589,030 | A | * | 12/1996 | Sande .................. D21C 5/02 162/14 |
| 5,755,830 | A | * | 5/1998 | Dilling ............... B01F 17/0057 8/524 |
| 2002/0038787 | A1 | * | 4/2002 | Hurwitz et al. .......... 210/650 |
| 2002/0153317 | A1 | * | 10/2002 | Heikkila et al. .......... 210/650 |
| 2006/0016751 | A1 | * | 1/2006 | Ali et al. .............. 210/644 |
| 2006/0280852 | A1 | * | 12/2006 | Harvey ............... A23L 1/226 426/534 |
| 2008/0121356 | A1 | * | 5/2008 | Griffith et al. ............. 162/16 |
| 2009/0014386 | A1 | * | 1/2009 | Manttari ............ B01D 61/027 210/637 |
| 2009/0270609 | A1 | * | 10/2009 | Heikkila et al. .......... 536/127 |
| 2011/0030587 | A1 | * | 2/2011 | Reknes .................. 106/725 |
| 2011/0212495 | A1 | * | 9/2011 | Diner .................... 435/99 |

FOREIGN PATENT DOCUMENTS

| | | |
|---|---|---|
| RU | 2 174 451 C2 | 10/2001 |
| WO | WO 2005/062800 A2 | 7/2005 |

OTHER PUBLICATIONS

Bhattacharjee et al., "Recovery of lignosulphonates and medium quality water from pulp and paper mill effluent using membrane technology," Indian J. Environ. Protect. 29:214 (2009).
Thesis of Jiri Zhor, "Molecular structure and performance of lignosulfonates in cement-water systems," The University of New Brunswick, Library and Archives of Canada, ISBN: 978-0-494-41252-7, (2005).
Third party observations under article 115 EPC for European Application No. 10807751.2; Date of Mailing: Feb. 26, 2013; 18 Pages.
Yang at al., "Properties of sodium lignosulfonate as dispersant of coal water slurry," Energy Conver. Manag. 48:2433 (2007).
Yang et al., "Physicochemical properties of calcium lignosulphonate with different molecular weights as dispersant in aqueous suspension," J. Disp. Sci. Technol. 29:1296 (2008).
Zhor et al., "Influence of lignosulphonate molecular weight fractions on the properties of fresh cement," Am. Concr. Inst. SP-173, pp. 781-805 (1997).
Xueqing et al. "Research on Properties of Calcium Lignosulfonate Water Reducer with Different Molecular Weights", *China Concrete and Cement Products* (1999) No. 3 June.
Chinese Application No. 201080057554.5; office action mailed Aug. 29, 2014.
English-language translation of CN 101274947 A.
Chinese Application No. 201080057554.5; office action mailed Dec. 13, 2013.
Notice of Opposition corresponding to European Application No. 10807751.2 issued Oct. 27, 2015.
Opposition to Patent No. EP 2 513 127 B1 filed on Oct. 14, 2015 (42 pages).
Ringena, O., Fraktionierung und Charakterisierung von elektrochemisch behandelten Magnesium-Sulfitablaugen, Ph.D. thesis, University of Hamburg, 2006 (89 pages).
Zhor, J., "Molecular Structure and Performance of Lignosulfonates in Cement-Water Systems", Ph.D. thesis, 2005, The University of New Brunswick, Library and Archives of Canada (278 pages).
Greenberg, A. E., Standard Method 4500-$SO_4^{2-}$—In Standard Methods for the Examination of Water and Wastewater, American Public Health Association, Washington, DC, 1992) (7 pages).
Marques et al. "Chemical Composition of Spent Liquors from Acidic Magnesium-Based Sulphite Pulping of *Eucalyptus globulus*", J. Wood Chem. Technol. 2009, 29:322-336.
Jönsson, A.-S. and Wimmerstedt, R. "The Application of Membrane Technology in the Pulp and Paper Industry", Desalination 1985, 53:181-196.
Menttari, M. and Nystrem, M., Chapter 35—Utilization of Membrane Processes in Treating Various Effluents Generated in Pulp and Paper Industry. In *Handbook of Membrane Separations: Chemical, Pharmaceutical, Food, and Biotechnological Applications*; Pabby, A.K., Rizvi, S.S.H., and Sastre, A.M. (Eds.); CRC Press 2008; pp. 981-1006.
Scott, K., Section 11—Industrial Waste Water and Effluent Treatment. In *Handbook of Industrial Membranes*, second ed.; Scott, K. (Ed.); Elsevier Science, Amsterdam, 1998; pp. 575-629.
Olsen, O. Membrane Technology in the Pulp and Paper Industry, Desalination 1980, 35:291-302.
Ekman, R. and Holmbom, B., The chemistry of wood resin. In *Pitch control, wood resin and deresination*; Back, E.L. and Allen, L. H. (Eds.); Tappi Press: Atlanta, 2000; pp. 37-76.
Rigol et al. "Sample Handling and analytical protocols for analysis of resin acids in process waters and effluents from pulp and paper mills", Trends Anal. Chem. 2003, 22:738-749.
Product description Borresperse re CA-SA (1 page).
Product description re Vanisperse CB (1 page).
Product description re Norlig 24C Powder (1 page).
Rojahn, T., "Production of lignin and lignosuifonates-Pulping processes", Borregaard Symposium on Workability and Workability retention, Løkken, Norway Sep. 1998 (2 pages).
Invoice re Borresperse CASA (batch No. E94MCO5A) (1 page).
Despatch note re Borresperse CASA (batch No. E94MCO5A) (1 page).
Bill of lading re Borresperse CASA (batch No. E94MCO5A) (1 page).
Picture of reference samples Borresperse CASA (batch Nos. E94KG03A and E94KLO1D) (1 page).
Description of analytical methods (4 pages).
Invoice re Borresperse CASA (batch No. E94KG03A) (1 page).
Despatch note re Borresperse CASA (batch No. E94KG03A) (1 page).
Bill of lading re Borresperse CASA (batch No. E94KG03A) (1 page).
Invoice re Borresperse CASA (batch No. E94KL01 D) (1 page).
Despatch note re Borresperse CASA (batch nd: E94KL01 D) (1 page).
Bill of Lading re Borresperse CASA (batch No. E94KL01 D) (2 pages).
Invoice re Vanisperse CB (batch No. 101817) (2 pages).
Delivery note re Vanisperse CB (batch No. 1 01817) (2 pages).
International way bill re Vanisperse CB (batch No. 101817) (2 pages).
Picture of reference sample Vanisperse CB (batch No. 101817) (1 page).
Invoice re Vanisperse CB (batch No. 191654) (1 page).
Delivery note re Vanisperse CB (batch No. 191654) (1 page).
Picture of Vanisperse CB (batch No. 191654) (1 page) , undated.
Screenshots of the opponent's process order transaction system re Norlig 24C (batch No. 04R-13) (1 pages).

(56) References Cited

OTHER PUBLICATIONS

Explanation re code 04R-13 (1 page).
Invoices (3) and delivery records (3) re Norlig 24C (6 pages).
Picture of reference sample Norlig 24C (batch No. 04R-13) (1 page), undated.
Picture of box of Aldrich sample Cat. No. 4 7, 1 04-6 (1 page).
Screen shot of opponent's analysis database re Aldrich sample Cat. No. 47, 104-6 (1 page).
Graphs showing molecular weight distribution of Vanisperse CB and Borresperse CASA samples (1 page).

* cited by examiner

LIGNOSULFONATE OF A CERTAIN QUALITY AND METHOD OF PREPARATION OF LIGNOSULFONATE OF A CERTAIN QUALITY

RELATED APPLICATIONS

This application is a 35 U.S.C. §371 national phase application of PCT Application PCT/SE 2010/051391, filed Dec. 15, 2010, which claims priority to SE 0901569-4, filed Dec. 16, 2009. The entire content of each of these applications is incorporated herein by reference.

TECHNICAL FIELD

The present invention relates to lignosulfonate of a certain quality and to a method of preparation of lignosulfonate of a certain quality. The lignosulfonate which constitute the starting material in the preparation of the inventive lignosulfonate and the in the inventive method is obtained from cooking of lignocellulose, such as wood, in a acidic, neutral or weak alkali process, wherein the cooking liquor contain at least one of the molecules $SO_2$, $HSO_3^-$ and $SO_3^-$. An additional source of lignosulfonate is the lignin of the cooking liquor of strong alkali processes, such as the sulfate or soda process. However, the lignin must be sulfonated using an appropriate sulfonation chemical, such as hydrogen sulfite ($HSO_3^-$) in such cases.

BACKGROUND

Lignosulfonate is very useful. Accordingly, there is a demand for it. Lignosulfonate of higher purity results in better properties and thereby a higher demand and a higher market price.

In the following, a (non-exhaustive) list of lignosulfonate applications is provided.

Lignosulfonate is used as a dispersion agent in various applications. In the preparation of concrete, lignosulfonate is used as a water-reducing agent, alone or in combination with other sulfonates (such as naphthalene or melamine) or poly-carboxylates. Lignosulfonates may also be used as an dispersion agent in various types of mineral slurries (of coke, chalk or ores), in other inorganic chemicals as well as in ceramic material, such in the production of brick or tile. The chemical in question may also be used for the dispersion of chemicals used in farming.

In the preparation of cement (wet milling), lignosulfonate may be used.

Lignosulfonate may be used as a complexing agent and as strength-improving agent in paper (fluting), as well as an additive to organic adhesives (such as phenol or melamine resins).

Lignosulfonate may be used as an emulgating agent in the preparation of e.g. wax, asphalt and various oils.

Another application is as a starting material in the production on chemically modified lignosulfonate, which is used in oil drilling and dispersion of pigment.

Lignosulfonate primarily is formed in the preparation of chemical pulp from lignocellulosic material, such as wood, as explained above. The most appropriate cooking method is sulfite cooking, which normally is an acidic or sometimes partly neutral process. One of the active cooking chemicals is hydrogen sulfite ($HSO_3^-$). In the preparation of the chemical pulp, e.g. according to the sulfite process, the lignin that is found between the cellulose fibers and to some extent in the fiber walls, is dissolved. During the cooking process, the hydrogen sulfite reacts with the lignin and the lignosulfonate is formed. The cooking is carried out under elevated temperature and pressure. At the end of the cooking, the processed material is blown. That is, a valve is opened in the bottom of the digester, and when the processed lignocellulosic material, normally in the form of chips, leaves the digester when the pressure falls to atmospheric, fibers are liberated, i.e. the processed lignocellulosic material (the chips) is converted to cellulose pulp.

The pulp fibers are at that point surrounded by used cooking liquor containing a large amount dissolved lignosulfonate-containing substance. Examples of other substances are various saccharides (derived e.g. from the hemicellulose of the lignocellulose), resin compounds and inorganic chemicals. This liquid is called spent liquor. The fibers are separated from the spent liquor and the two materials take different paths. The spent liquor is evaporated to a dry content of above 60% such that thick spent liquor is obtained. The thick spent liquor is combusted in a soda recovery boiler under the formation of heat (energy) and a melt of inorganic chemicals, which is the starting material in the preparation of fresh cooking liquor.

In the pulping plants, primarily sulfite pulping plants, that not only produces pulp for sale but also markets lignosulfonate, an amount of spent liquor is diverted from the cycle of recovery of the spent liquor, production of the thick spent liquor, combustion in the soda recovery to obtain the melt and conversion of the melt to fresh cooking liquor. The proportion of spent cooking liquor that is diverted from the cycle for the recovery and subsequent marketing of the lignosulfonate is determined by a number of conditions or parameters. The spent cooking liquor for lignosulfonate recovery is diverted at any point from where the spent liquor (which may be blended with spent bleach liquor) is formed up to the thick spent liquor formation. An important parameter is the dry content of the spent cooking liquor in the position of the diversion. On the one hand, it is desirable to limit the water content of the spent cooking liquor or lignosulfonate since it is expensive to transport material having a high water (inactive substance) content and the customers are not interested in obtaining a bulky product comprising a lot of the inactive substance. On the other hand, the handling of the lignosulfonate becomes more difficult when the dry matter content is too high. A very important parameter of the water-containing lignosulfonate solution is the viscosity, which is further discussed below. The viscosity increases with falling temperatures of the solution. Sometimes this necessitates a continuous heating of the solution, from the loading at the pulping plant to the unloading at the customers, which is costly.

In full scale, i.e. industrially, the quality improvement of the lignosulfonate have been limited to the ultrafiltration of the water solution in one step using a membrane having a comparatively low cut-off, such as 5-20 kD.

DISCLOSURE OF THE INVENTION

Technical Problem

Even if parts of the market accept native, i.e. unrefined, lignosulfonate, there is a need for a refined, i.e. quality improved, lignosulfonate. The need appears to increase with time.

The Solution

Process for improving the quality of lignosulfonate at least partly derived form a spent sulfite cooking liquor in at least two steps, comprising:

one step in which a lignosulfonate-containing fraction at least partly derived from the spent sulfite cooking liquor is subjected to filtration using a membrane having a cut-off of 40-150 kD (high cut-off) at the pressure, flow rate and temperature of the step and the permeate is recovered; and another step in which a lignosulfonate-containing fraction at least partly derived from the spent sulfite cooking liquor is subjected to filtration using a membrane having a cut-off of 1-20 kD (low cut-off) at the pressure, flow rate and temperature of the step and the retentate is recovered.

In that manner, substances of too high or too low molecular weight are removed from the material flowing through the process. The refined material flow may be subjected to further processing, such as removal of the majority of the remaining water.

In most cases, it is beneficial if the material flow is passed through a mechanical filter, such as a screen, before the material flow is routed to the first step of ultrafiltration. Thereby, solid contaminants, such as cellulose fibers or parts thereof, are removed.

Pumps arranged before and within the ultrafiltration step are primarily employed to force the material flow forward, but also to build a material flow pressure that is appropriate for the ultrafiltration.

A parameter of the ultrafiltration is the temperature of the material flow. According to one embodiment, the maximum temperature is 150° C. since some membranes are not designed for higher temperatures. A suitable temperature is 50-140° C., and a preferred temperature is 85-100° C. From an energy view point, it is preferred to, as far as possible, use the original/incoming temperature of the material flow, provided that it is high enough. The optimal temperature of the material flow is high enough if it promotes the flow through the membrane resulting in a high production capacity, while not being so high that there is a risk of lignosulfonate molecule condensation.

Here, it is also notable that the temperature is normally increases by about 10-15° C. during the filtration steps if the liquid is pressurized (e.g. pumped).

There are various types of ultrafiltration membranes and all of these can be used in the inventive process. The predominating types are those composed of organic polymers or ceramic material. Examples of organic polymers are polyamides, cellulose acetate, polyacrylnitrile, polyeter sulfonate, polysulfonate and polyvinylidenefluoride (PVDF). An example of a ceramic material is aluminum oxide ($Al_2O_3$). On the market, there is such a membrane called atech 37/3.6, which has been shown to function well in practice. The membrane as such consists of $Al_2O_3$, but the walls of the pores are covered by a thin layer of zirconium oxide ($ZrO_2$) or titanium oxide ($TiO_2$). Other suitable ceramic membranes on the market are those called KERASER™ high flux rate ceramic monolits and KERASER™ Diamond. Such ceramic membranes are only available in tubular shape.

At a material flow temperature of above 85° C., membranes composed of organic polymers are less suitable and in some cases unusable. Since a material flow temperature of 85-100° C. is preferred, it is natural and preferable to use a ceramic membrane.

Even though it is possible to use a membrane of a low cut-off in the first ultrafiltration step, it is preferred to use a membrane of a high cut-off in the first step and a membrane of a low cut-off in the second step. The preferred sequence entails benefits. The major benefit of removing the high-molecular material first is that the capacity in the following ultrafiltration step can be significantly increased (compared to the reversed order of steps). This benefit results in increased production of lignosulfonate and/or improved lignosulfonate purity.

The two-step ultrafiltration of the material flow results in an increased dry matter content. The dry matter content in question depends on several factors, of which one important is the dry matter content of the original material. If the original spent cooking liquor has a dry matter content of 16-20%, the dry matter content after the ultrafiltration steps may be around 27-33%. Such a product may be sold on the market (to the user) directly. It is also possible and even preferred to increase the dry matter content of the lignosulfonate water solution even further before it is sold on the market. However, it should be kept in mind that the lignosulfonate mixture become viscous and even hard to handle at a dry matter content of 40-45%.

As mentioned above, this product of improved quality may be used as a starting material in the production of further refined products, e.g. by reacting the lignosulfonate in question with various chemicals.

Even though the so far described lignosulfonate of improved quality, e.g. in the form of a viscous water solution, is accepted and highly demanded on the market, the lignosulfonate in question may be further improved by converting it from a viscous water solution to a solid, e.g. a powder. This may be accomplished by subjecting the water-containing material flow that has been ultra-filtrated in two steps to evaporation followed by spray drying such that a dry matter content of above 90% is obtained. When the lignosulfonate is converted to a powder, the above-mentioned possible drawbacks of the product (the reduced workability and the transportation of water, which is an inactive substance) are avoided. The powder form of the quality-improved lignosulfonate may also be further refined according to the above, e.g. chemically.

The present invention also includes a lignosulfonate-containing product comprising less than 4 wt. % sulfate ($SO_4^{2-}$) based on dry material obtained by a process comprising:

one step in which a lignosulfonate-containing fraction at least partly derived from spent sulfite cooking liquor is subjected to filtration using a membrane having a cut-off of 40-150 kD (high cut-off) at the pressure, flow rate and temperature of the step and the permeate is recovered;

another step in which the permeate is subjected to filtration using a membrane having a cut-off of 1-20 kD (low cut-off) at the pressure, flow and temperature of the step and the retentate is recovered.

A condition that has to be clarified is that the original lignosulfonate in the form of recovered spent cooking liquor (or a mixture of spent cooking liquor and spent bleaching liquor) from a chemical point of view actually is somewhat undefined. Lignosulfonate as a single chemical entity is however predominating in terms of quantity. The spent cooking liquor contains a large number of chemicals, both organic and inorganic, in various amounts. For example, the spent cooking liquor contains high levels of sulfate ($SO_4^{2-}$). It has been shown that the concentration of sulfate should be below 4 wt. %, based on dry material. If the water-containing lignosulfonate solution is allowed to flow through membranes having a low cut-off value, most of the lignosulfonate molecules are stopped and comprised in the concentrate, while most of the original sulfate passes through the membrane and is comprised in the permeate.

The amount of sulfate that passes the membrane depends partly on the amount of sulfate ions in the original solution, e.g. the acidic cooking liquor. Under all circumstances, at least half of the original amount of sulfate should be removed. It is preferred that the sulfate concentration of the lignosulfonate is below 2 wt. % based on dry material.

Saccharides, both pentoses, such as xylose, and hexoses, primarily mannose and glucose, are normally present in the spent cooking liquor, i.e. the original solution, in significant amounts. The inventive ultrafiltration lowers the saccharide content of the lignosulfonate solution to below 10 wt. %, such as below 5 wt. %, based on dry material.

Another troublesome content of spent cooking liquor is resins, and the inventive ultrafiltration lowers the resin content to below 1 wt. %, such as below 0.5%, based on dry material.

Below, it is explained why the above-mentioned unwanted chemicals impairs the properties of the lignosulfonate.

Some exemplary embodiments of the present invention are here provided as items:

1. Process for improving the quality of lignosulfonate, comprising routing lignosulfonate-containing water-based liquid (material flow) under pressure to a membrane-containing ultrafilter, characterized in that said material flow is ultrafiltrated in two steps, one step in which the ultrafiltration membranes have a high cut-off, such as at the most or close to 100 kD (at a certain pressure, a certain flow and a certain temperature) and one step in which the ultrafiltration membranes have a low cut-off, such as 5 kD or close to 5 kD (at a certain pressure, a certain flow and a certain temperature), such that substances of too high or too low molecular weight are removed from the material flow, followed by recovery of the refined material flow or routing of the refined material flow to further processing, such as removal of the majority of the remaining water.
2. Process according to item 1, characterized in that the material flow, before the ultrafiltration, is passed through a mechanical filter, such as a screen, to remove solid contaminants.
3. Process according to item 1 and 2, characterized in that the material flow, before and during the ultrafiltration, is passed through pumps that creates a material flow pressure that is appropriate for the ultrafiltration.
4. Process according to items 1, 2 and 3, characterized in that the ultrafiltration is carried out when the material flow has a temperature of 50-140° C., preferably 85-100° C.
5. Process according to item 4, characterized in that an optimal temperature in the ultrafiltration is controlled based on that it sufficiently high to facilitate the flow and thereby the production capacity, but not so high that there is a risk of condensation of the lignosulfonate molecules.
6. Process according to items 1, 2, 3, 4 and 5, characterized in that the material flow in a first step is ultrafiltrated using a membrane of a high cut-off and subsequently, in a second step, using a membrane of a low cut-off.
7. Process according to items 1, 2, 3, 4, 5 and 6, characterized in that the employed ultrafiltration membranes are composed of ceramic material.
8. Process according to items 1, 2, 3, 4, 5, 6 and 7, characterized in that the material flow that has been subjected to the two-step ultrafiltration is subjected evaporation followed by spray drying to produce a powder having a dry matter content of more than 90 wt. %.
9. Lignosulfonate comprising less than 4 wt. % sulfate ($SO_4^{2-}$) based on dry material, characterized in that the molecular weight of the lignosulfonate is limited to a range having an upper limit defined by molecules that are generally stopped by ultrafiltration membranes having a cut-off of at the most or close to 100 kD (at a certain pressure, a certain flow and a certain temperature) and the lower limit is defined by molecules that are generally stopped by ultrafiltration membranes having a cut-off of 5 kD or close to 5 kD (at a certain pressure, a certain flow and a certain temperature).
10. Lignosulfonate according to item 9, characterized in that the total amount of saccharides is below 10 wt. % based on dry material.
11. Lignosulfonate according to item 9 or 10, characterized in that the amount of resins is below 1 wt. % based on dry material.

For those not skilled in the art, the definition "molecules that are generally stopped by ultrafiltration membranes" may appear to be unclear. This is however not the case, since in the art of ultrafiltration there are no exact limits. For example, if a membrane having a cut-off of 5 kD is chosen, not every single molecule having a molecular weight above 5 kD is stopped, i.e. not capable of passing through, but a small number of such molecules (having molecular weights just above the cut-off) gets through.

Benefits

The content of undesired components, such as sulfate, saccharides and resins, of inventive lignosulfonate is low, resulting in a product that is demanded on the market for a large number of applications. The product is particularly suited for being a dispersion agent, particularly in the preparation of liquid concrete that is later hardened.

During transportation of lignosulfonate in liquid form, i.e. as a solution, the high viscosity of the liquid is a problem. The inventive process lowers the viscosity of a water solution of the lignosulfonate. This may be utilized in two ways; by providing a liquid that is less viscous given a certain dry matter content, i.e. better workability, or by reducing the water content given a certain viscosity.

According to a particularly preferred embodiment of the inventive process, the recovery of the inventive lignosulfonate is connected to/integrated with the preparation of chemical pulp, such as sulfite pulp.

In such a case, the unwanted components that are removed from the inventive lignosulfonate, such as sulfate ions, saccharides and some short-chained lignosulfonate that penetrates the ultrafiltration membrane of the lower kD and resin micelles and long-chained lignosulfonate incapable of penetrating the ultrafiltration membrane of the higher kD may be recovered and mixed with the spent liquor on the way to primary evaporation, followed by evaporation an final combustion in the soda recovery unit. The long-chain lignosulfonate normally has no positive effects on the properties of the product, and if such material is retained in the recovered lignosulfonate, it acts, in the best case, as a harmless ballast.

BEST MODE

Figure 1:
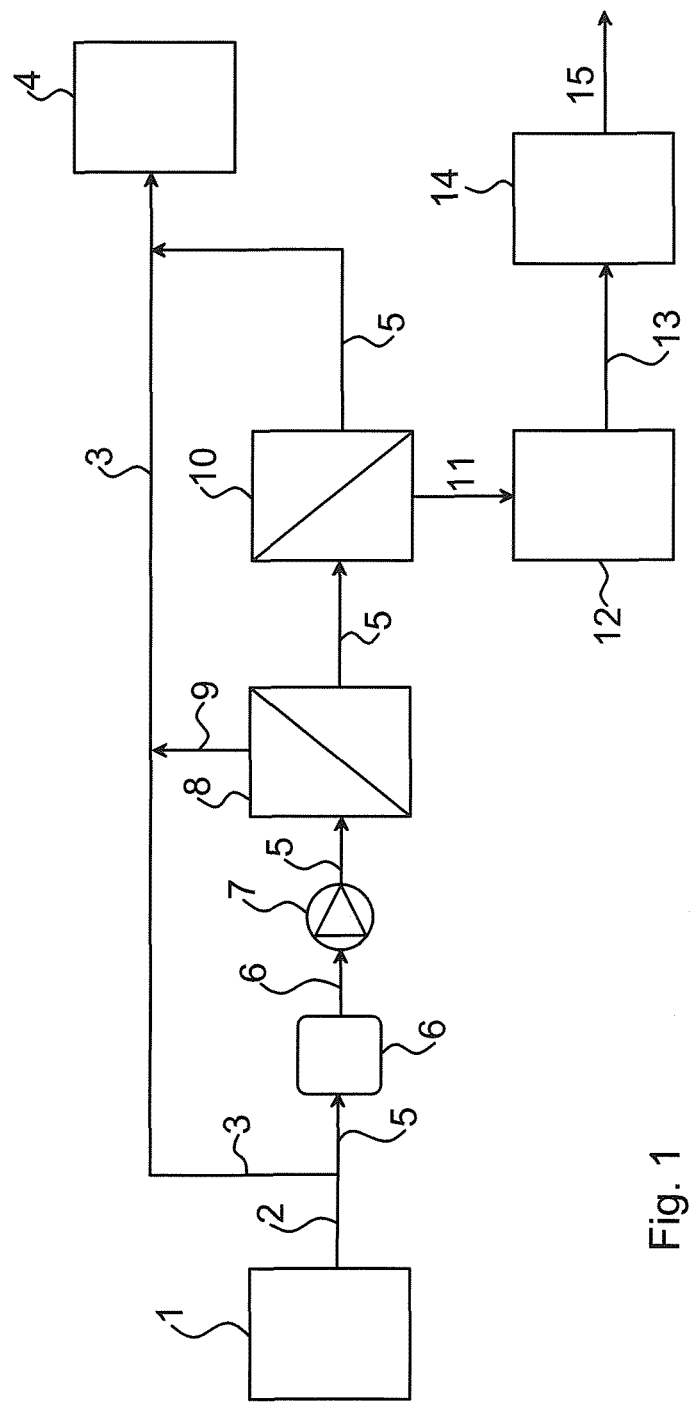
In FIG. 1, a flow scheme of a preferred embodiment of the inventive process is shown.

Below, a preferred embodiment of the inventive process is described with reference to FIG. 1. I connection thereto, some sub-steps are described in more detail. In addition, a few alternative embodiments of the inventive process are described in more detail. Finally, there are provided a number of exemplary embodiments in which the inventive process is simulated in a laboratory and the properties of the obtained products are analyzed.

As explained above, the original lignosulfonate is preferably obtained from the preparation of sulfite pulp. In the sulfite pulping process, the spent cooking liquor is recovered. This liquor is collected in a large tank, normally referred to as a sulfite spent liquor tank. Such a tank is found in the flow scheme with reference number 1. Normally, the term spent cooking liquor is used alone, but industrially, the liquor collected in the tank 1 may be a mixture of spent cooking liquor (which is the major part) and one or more spent bleaching liquors, e.g. from oxygen or peroxide bleaching. This liquor is referred to as "acidic sulfite spent liquor". (In the less common case of an ethanol factory connected to the sulfite pulping process, said acidic sulfite spent liquor may be replaced by mash from the fermenter. A benefit of this is that a reduced monosaccharide content in the raw material results in reduced, unwanted, saccharide-content in the final product.) The acidic sulfite spent liquor is routed from the tank 1 via the pipe 2. The original flow is divided into two; one major flow which is routed via pipe 3 to an evaporation unit 4, and one minor flow which is routed via pipe 5 to a mechanical filter 6 of any appropriate type, e.g. a type of screen, known to the person skilled in the art of pulping. The screen 6 removes solids, such as cellulose fibers or fiber residues. The purification of the lignosulfonate-containing liquor, which may have a dry solids contents of 16-20%, results in a longer lifetime of the ultrafiltration membranes than if no purification is performed, and the time of operation between the necessary cleanings of the ultrafiltration membranes is extended. By means of a feeding pump 7, the pressure of the liquor is increased to e.g. 800 kPa before it is feeded to the first ultrafiltration step 8, comprising a membrane of a higher cut-off, at the most 100 kD. Other working cut-off values are in the range of 60-100 kD. In the figure, the ultrafiltration step 8 (the stack) is shown very schematically. In practice, i.e. industrially, the step or stack consists a plurality of, e.g. two, modules comprising membranes. Between (or before any one of) the modules, there is a pump (not shown) by means of which the lignosulfonate-containing liquor repeatedly is circulated through the modules. By means of the circulation pump, the pressure is further increased, e.g. to 1100 kPa. There is a continuous inflow of liquor to the ultrafiltration step and an outflow of concentrate (retentate) and filtrate (permeate). The concentrate is enriched in high molecular weight-molecules, while the content of molecules of high molecular weight in the filtrate has become significantly reduced. The concentrate is routed via pipe 9 to the pipe 3, where it is mixed with the original flow of acidic sulfite spent liquor, which in turn is routed to the primary evaporation 4. The concentrate contains not only high molecular weight-lignosulfonate, but also other components such as acids of resins and lipids. In the acidic environment, such acids form micelles that are stopped by the membrane. The removal of these agents, i.e. the high molecular weight-lignosulfonate and the extractives (resins), results in a quality improvement. The high-molecular lignosulfonate normally has no beneficial effect on the dispersant capacity of the lignosulfonate, which is a desired property, and further, it contributes to an increased viscosity of a lignosulfonate water solution, which is an unwanted effect. The extractives has a negative impact on the lignosulfonate properties in concrete, e.g. because they entrain air resulting in foaming, which lowers the strength of the concrete.

The filtrate, which i.a. contains the desired part of the lignosulfonate is routed via the pipe 5 to the second ultrafiltration step 10. This step is also presented very schematically. In practice, i.e. industrially, the step may consist of three modules connected in series, comprising membranes having a low cut-off, such as 5 kD or close thereto. In this step, the concentrate from the first module constitutes the inflow to the second module and so on. Also here, circulation pumps are connected to each module. The filtrate (permeate) from the three modules is merged and transported via the pipe 5 to the pipe 3 where it is mixed with the original flow of acidic sulfite spent liquor, which in turn is routed to the primary evaporation 4. The filtrate contains large amounts low-molecular agents. In this context, the sulfate ions are important. It is desirable to, as far as possible, remove sulfate from the final product, i.e. the high-quality lignosulfonate. High amounts of saccharides, which are removed via the filtrate, should also be avoided in the final product. Some low-molecular lignosulfonate is also removed via the filtrate.

The above-mentioned ultrafiltration treatment in two steps results in increased dry matter content, e.g. 27-33%.

The concentrate is recovered via the pipe 11. It is possible to sell this product on the market (possibly after a slight further concentration). A preferable alternative is to route the concentrate via the pipe 11 to an evaporation step 12 which increases the dry matter content to e.g. 45-50%. Thereafter, the material is routed to a spray dryer 14 increasing the dry matter content to above 90% resulting in a lignosulfonate in the form of a powder. From the spray dryer, the material is routed via the pipe 15 to e.g. a packaging unit.

The process for preparation/recovery of lignosulfonate of high quality described above is very beneficial since no material or material flow is wasted, and consequently, no problems of deposition arise. Two material flows are diverted from the process; the concentrate (rejected material) which is routed away via the pipe 9, and the permeate (rejected material) which is routed away via the pipe 5. Both are recovered in a natural way by mixing them into the original flow of acidic sulfite spent liquor on the way to the evaporation step 4.

The cut-off values of membranes are not universal. Rather, the cut-off:s depend on the specific conditions of each ultrafiltration. Relevant parameters are the pressure, flow rate and temperature of the liquor penetrating the membrane. Unfortunately, there is no international standard clarifying the way cut-off values should be determined. As a membrane user, you have to rely on analyses published by the manufacturers of the membranes (which use the parameters of their choice).

EXAMPLE 1

Acidic sulfite spent liquor was obtained from a sulfite pulping plant and transported to a laboratory. The acidic sulfite spent liquor consisted of a mixture of spent liquor (major part by quantity) and peroxide spent bleaching liquor. The dry matter content of the acidic sulfite spent liquor was 16.4%.

This water solution containing e.g. lignosulfonate was ultrafiltrated in two steps using laboratory equipment. The ultrafiltration membranes employed was ceramic and of the type Atech 37/3.6. The one membrane had a cut-off of 60 kD and the other a cut-off of 5 kD.

Step 1 using the 60 kD membrane

The acidic sulfite spent liquor was heated to 95° C. and part of this liquor was used for heating the membrane to the same temperature.

The operation parameters were adjusted to appropriate conditions:
Temperature: 95° C.
Flow rate of the liquor in the membrane channels: 5 m/s
Pressure at the start of the concentration: 25 kPa
Volume concentration factor (VCF): 3.0

Permeate was produced until the appropriate concentration factor, i.e. 3.0, was obtained. At this point, recovery of concentrate from the ultrafiltration was initiated. The recovery of concentrate and permeate was controlled such that the concentration factor was maintained. The permeate was produced in a sufficient amount for being used in a second ultrafiltration step.

Step 2 using the 5 kD membrane

The in step 1 produced permeate was heated to 95° C. and part of this liquor was used for heating the membrane to the same temperature.

The operation parameters were:
Temperature: 95° C.
Flow rate of the liquor in the membrane channels: 5 m/s
Pressure at the start of the concentration: 240 kPa
Volume concentration factor (VCF): 6.0

Permeate was produced unit the appropriate VCF, i.e. 6.0, was obtained. At this point, recovery of the concentrate was initiated. The recovery of concentrate and permeate was controlled such that the concentration factor was maintained. The production of concentrate (the desired final product) was continued as long as necessary to obtain a sufficient amount of the inventive product. The dry matter content of the product was 28.9%.

To study how the viscosity of a water solution of the inventive product compares to another product that has not been produced according to the invention, part of the obtained material was concentrated to a dry matter content of 41.5%.

A product obtained from a full-scale ultrafiltration plant, wherein acidic sulfite spent liquor of the same origin as described above had been ultrafiltrated in one step using a ceramic membrane of type Atech 37/3.6 having a cut-off of 5 kD, was used as a reference sample.

The operation parameters were:
Temperature: 95° C.
Flow rate of the liquor in the membrane channels: 5 m/s
Pressure at the start of the concentration: 1100 kPa
Volume concentration factor (VCF): 6.0

In the above-mentioned production unit, the obtained lignosulfonate was concentrated to a dry matter content of 43.5%. In the laboratory, this product was diluted with distilled water such that two samples having dry matter contents of 41.8% and 39.6%, respectively, were provided.

The viscosity of these solutions was measured in the temperature range 25-80° C. The viscosity in centipoise (cP) was determined using a viscometer from Viscosimeters UK Ltd. at 20 r.p.m using different bobs according to the manual.

The measurements were carried out according to an internal standard at MoDo Research Örnsköldsvik AB.

Figure 2:
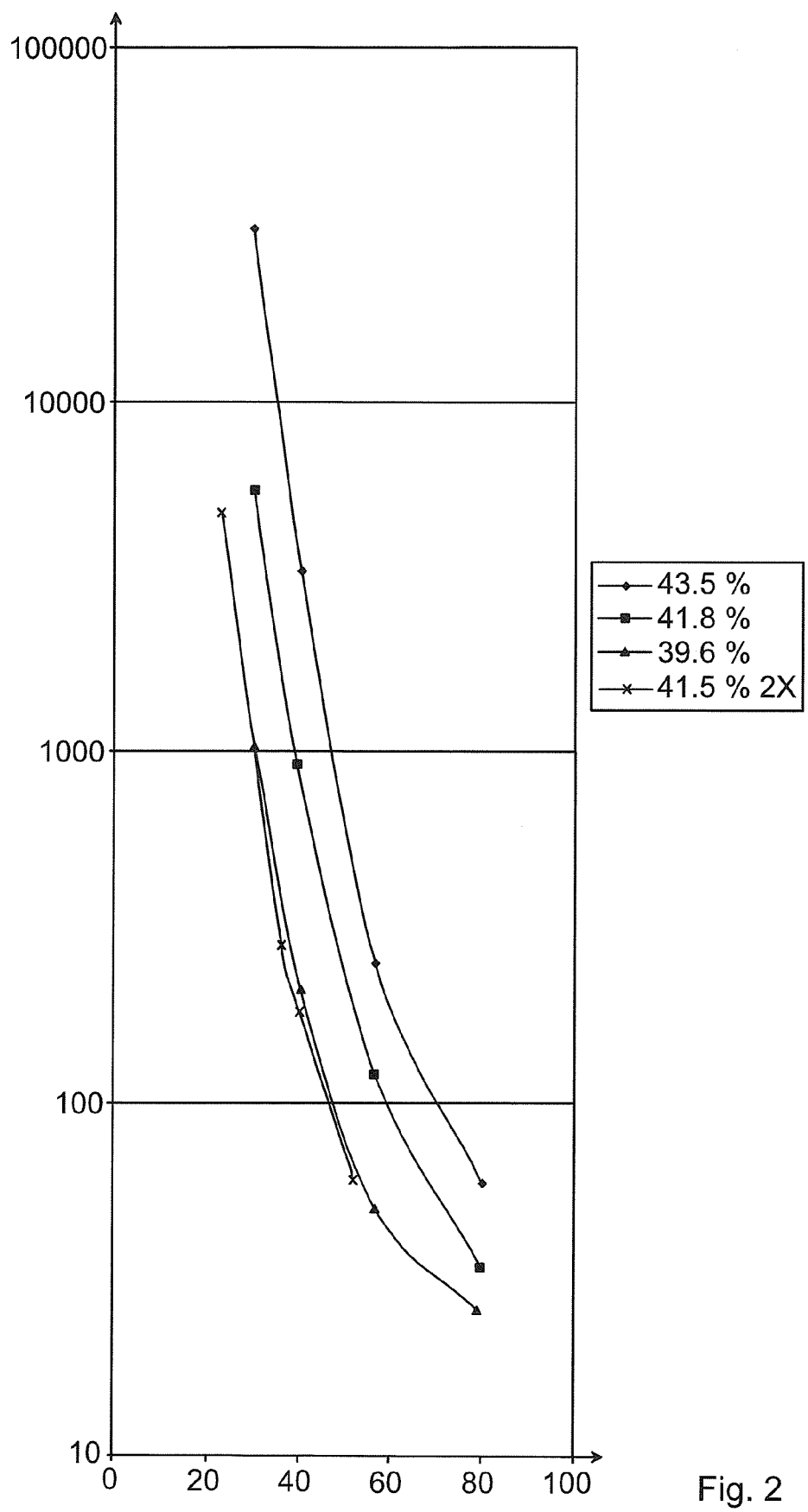
In FIG. 2, the viscosity's (cP) dependence on the temperature (° C.) of various lignosulfonate water solutions is shown. Both a lignosulfonate water solution according to the present disclosure and a conventional water solution are included.

In FIG. 2, the obtained results are presented. The curve with diamonds represents a dry matter content of 43.5%. The curve with squares represents a dry matter content of 41.8%. The curve with triangles represents a dry matter content of 39.6%. The lignosulfonate behind these three curves was recovered using the known technology. The curves (duplicates) with crosses represent a dry matter content of 41.5% of lignosulfonate recovered according to the invention.

As shown by the curves in figure two, the inventive lignosulfonate has the lowest viscosity at principally all temperatures. The lignosulfonate water solution of known type that is closest to the inventive lignosulfonate water solution has a dry matter content of 39.6% compared to 41.5% for the inventive lignosulfonate water solution. In other words, the dry matter content of the inventive lignosulfonate may be increased by 2% and still maintain the same viscosity as a water solution of the known lignosulfonate. In practice, this is of great importance for the workability of the lignosulfonate solution.

EXAMPLE 2

As mentioned in the beginning of the present disclosure, there are several applications for lignosulfonate. One important application requiring larger amounts is the use thereof as an water-reducing/dispersion additive in the preparation of concrete. Therefore, laboratory experiments were carried out, in which lignosulfonate of various types and qualities was added in the production of concrete paste from cement, sand, aggregate and water.

The product obtained in example 1, i.e. the product according to the invention, was on of the products tested. Another product according to the invention, almost identical to the first, was also tested. For the preparation of this product, it is referred to example 1. The only difference was that the ceramic membrane of the first step having a cut-off of 60 kD was replaced with a membrane of the same type having a cut-off of 100 kD. Both products were provided as water solutions, i.e. in the liquid form. No evaporation of the lignosulfonate solution was carried out after the second ultrafiltration step and the dry matter contents of the solutions were 28.2% and 26.8%, respectively. The pH of the former solution was adjusted to 6.5 by the addition of sodium hydroxide. The pH of the latter solution was not adjusted and maintained at 2.2. Concrete pastes were prepared from the mixture of material with the addition of said water reducing agents (see below) and denoted 1 and 2.

A zero sample (reference sample) was prepared without the addition of the water reducing agent and denoted 0.

The above acidic sulfite spent liquor was treated in the laboratory according to the above with the difference that only one ultrafiltration step with a ceramic membrane having a cut-off of 20 kD was employed. The part of the acidic sulfite spent liquor that did not penetrate, but was stopped by the membrane was collected. The dry matter content was 28.9% and no neutralization was performed. Concrete paste comprising this lignosulfonate product was prepared and denoted 3.

Lignosulfonates in the form of unrefined acidic sulfite spent liquor (not ultrafiltrated) having two very different dry matter contents were recovered and mixed into the paste. In the first case, the pH of the acidic sulfite spent liquor was adjusted to 6.5 using an aqueous sodium hydroxide solution and evaporated to a dry matter content of 48.6%. In the second case, the pH was again adjusted to 6.5 and evaporated to a dry matter content of 97.0%. That is, the product was solid, i.e. a powder. These two products were also mixed into the material mixture, from which concrete paste was prepared. The two pastes were denoted 4 and 5, respectively.

A sixth lignosulfonate product was mixed into the material mixture followed by concrete paste preparation. This product differed from the others in that it comprised lignin recovered from spent liquor from sulfate pulping and reacted with a sulfonation chemical so as to obtain a lignosulfonate solution having a dry matter content of 16.9%. The prepared concrete paste was denoted 6.

In all cases, the lignosulfonate products were added to the material mixture in an amount of 0.2% (dry material) based on the amount of dry cement added.

Two properties of the concrete pastes, the settlement and the amount of air, were measured according to the standard SS-EN 480-1.

The type of cement used was construction cement CEM II/A-L 42.5 R manufactured by Cementa AB. The type of sand used was Riksten 0/8 from Jehander AB and the type of aggregate used was Vendels 8/16 from Swerock AB.

The material mixture is presented below and the amounts are in kg/m³.

TABLE 1

| Cement | 350 |
| 0/8 sand | 1137 |
| 8/16 aggregate | 612 |
| Water | 206.5 |
| Lignosulfonate | Se above |
| w/c | 0.59 |

The concrete paste was prepared in batches of 20 L using a paddle agitator of type Zyklos ZK30E. The following sequence of steps was used:

1. Addition of sand and aggregate and half of the water
2. Agitation time: 2 minutes
3. Resting time: 2 minutes
4. Addition of cement and lignosulfonate and the remaining water
5. Final agitation during two minutes Following the completed preparation, a bucket-shaped vessel of sheet metal was filled with part of the concrete paste. The height of the vessel was 300 mm and the diameter of the fixed bottom was 100 mm, while the diameter of the open top was 200 mm. After the vessel was filled to the rim with concrete paste, it was turned upside down and placed on a waterproof surface. Then, the vessel was removed such that the concrete paste was exposed and formed a column in the shape of truncated cone. When said concrete paste was uncovered, it started to settle and the degree or the measure of the lowering is referred to as the settlement measure and measured in millimeters.

The measurement was performed at three points. The first was directly after the removal of the vessel and since the time was calculated from the addition of the cement to the material mixture, the first point was 4 minutes. The other points were 30 and 60 minutes after the cement addition, respectively. The above method of measuring the settlement measure follows the Swedish standard SS-EN 12350-2.

After the third settlement measure was scored, the air content of the concrete paste was measured according to the specification in SS-EN 12350-7.

The measured values are presented below in table 2.

TABLE 2

| | Settlement measure (mm) Point of time (min) | | | |
|---|---|---|---|---|
| Type of paste | 4 | 30 | 60 | Air content (%) |
| 0 | 70 | 50 | 40 | 3.2 |
| 1 | 185 | 115 | 90 | 4.8 |
| 2 | 185 | 105 | 80 | 3.2* |
| 3 | 180 | 120 | 90 | 6.5 |
| 4 | 140 | 70 | 50 | 4.4 |
| 5 | 155 | 95 | 65 | 4.6 |
| 6 | 155 | 110 | 85 | 6.5 |

The settlement measure should be as high as possible (within reasonable limits) since it describes the flowing properties of the concrete paste, i.e. the ease of which it spreads out in a concrete mould at a certain water-to-cement ratio. The addition of a water reduction/dispersion agent increases the settlement measure significantly; compare the value of the zero sample (70) with those of the lignosulfonate pastes (140 and higher). The best result was obtained for the concrete pastes 1 and 2, i.e. the pastes to which the inventive lignosulfonate was added; the value was in both cases 185 mm.

Regarding the settlement measure of the point 30 min, it should be added to the first value, i.e. that of 4 minutes, and likewise, the settlement measure of the point 60 minutes should be added to the first two values.

It is preferred to have low air content. It is however unavoidable that the addition of a water reducing agent, such as lignosulfonate, increases the air content of the concrete paste. The object is to keep the increase as low as possible. As shown, the lignosulfonate addition results in an air content increase of about 1 percentage unit compared to the zero sample. The air content value of concrete paste 2, i.e. the second of the pastes that contain inventive lignosulfonate, has been provided with an asterisk. This value is too low because the sample was stored for 4 months in a plastic can provided with a tight seal before the experiment. Other experiments have shown that storage of the lignosulfonate decreases the air content of the concrete paste, while it has no effect of the settlement measure. The air content value is assumed to have been slightly more than 1% higher if fresh inventive lignosulfonate had been used.

The fact that the addition of lignosulfonate may considerably increase the air content is illustrated by samples 3 and 6 showing an air content of 6.5%. In these cases, the lignosulfonate was the lignosulfonate ultrafiltrated in only one step (sample 3) or the sulfate lignin sulfonated afterwards (sample 6). Thus, in addition to the disadvantage of the extra processing step, the separately sulfonated lignin originating from sulfate pulping also results in increased air entrainment.

The tests show that the inventive lignosulfonate provides better properties; both if looking at the settlement measure compared to unmodified lignosulfonate and at the air entrainment compared to lignosulfonate ultrafiltrated in only one step using a membrane having a cut-off of 20 kD.

EXAMPLE 3

Figure 3:
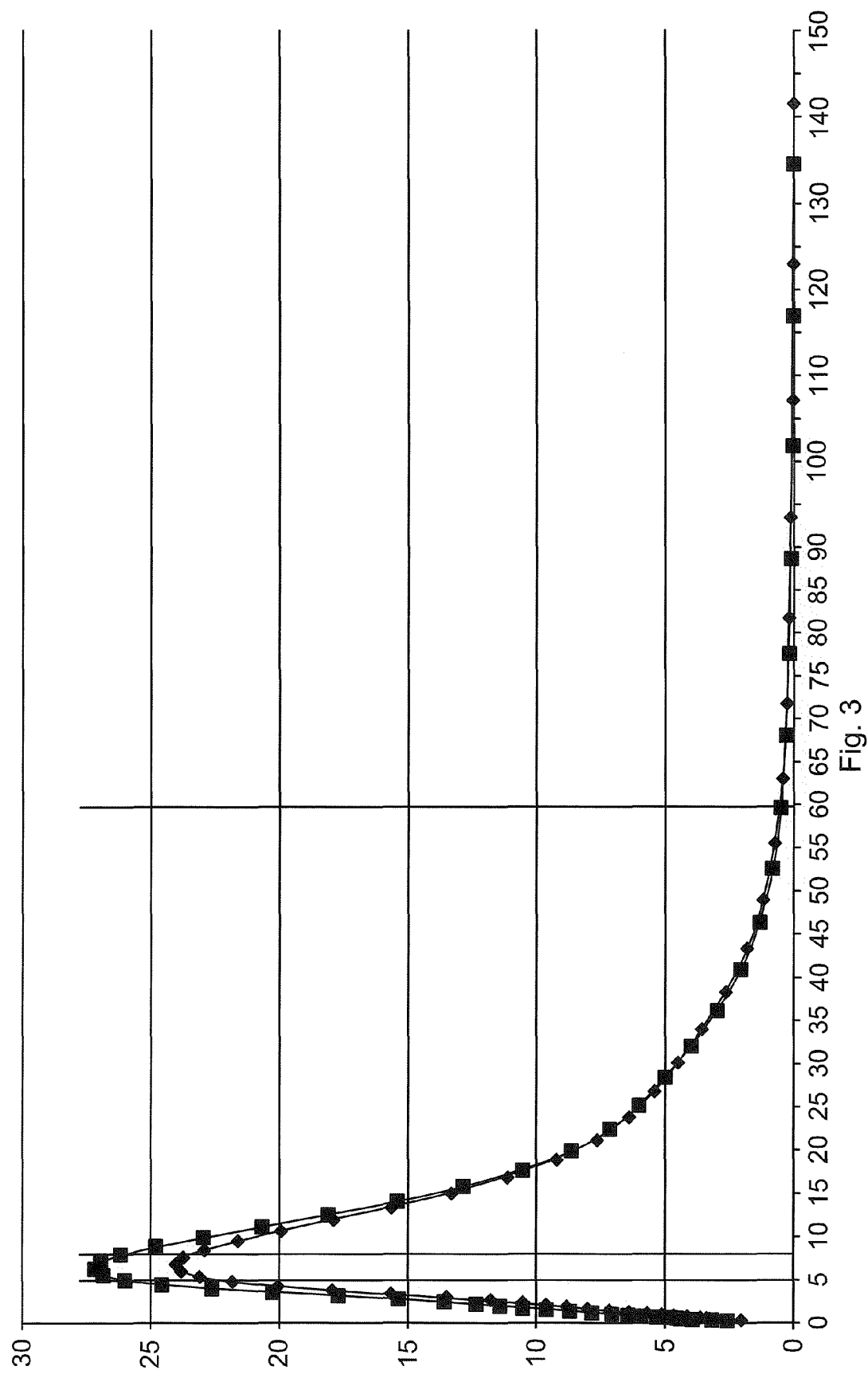
In FIG. 3, the molecular weight distribution of two products according to the invention is shown. The x-axis shows the molecular weight in kD and the y-axis shows the response in mV. The response corresponds to the total mass. Thus, the area under the graph corresponds to the mass distribution in the product.

The molecular weight distribution of two products obtained by filtration of acidic sulfite spent liquor at two different occasions was analyzed. In both cases, the liquor was first filtrated using a membrane having a cut-off of 60 kD and the permeate was recovered, followed by filtration of the permeate using a membrane having a cut-off of 5 kD and recovery of the retentate. The molecular weight distributions of the retentates/products are shown in FIG. 3. Most of the material in the products having a molecular weight of more than 5 kD is lignosulfonate. Further, a substantial part of the material in the product having a molecular weight below 5 kD is lignosulfonate.

In the product where the data points are represented by diamonds (♦), about 2 wt. % of the material has a molecular weight of more than 60 kD. However, the part of the lignosulfonate molecules that have a molecular weight to above 60 kD may be somewhat higher than 2 wt. % since all the material of the product having a molecular weight below 5 kD is not lignosulfonate. In the product where the data points are represented by squares (■), the part of the material that has a molecular weight of more than 60 kD is lower than in the other product.

In embodiments of the products according to the present disclosure, less than 5 wt. % of the lignosulfonate molecules have a molecular weight of more than 60 kD. In further embodiments, less than 4, 3 or 2 wt. % of the lignosulfonate molecules have a molecular weight of more than 60 kD.

As discussed above, limiting the part of the lignosulfonate having a molecular weight of above 60 kD reduces the viscosity and thus facilitates workability.

In both products, the peak value of the molecular weight distribution is between 5 and 8 kD.

The invention claimed is:

1. Process for refining lignosulfonate at least partly derived from a spent sulfite cooking liquor in at least two steps, comprising:

one step in which a lignosulfonate-containing fraction at least partly derived from the spent sulfite cooking liquor is subjected to filtration at a pressure, flow rate and temperature using a membrane having a cut-off of 40-150 kD (high cut-off) at the pressure, flow rate and temperature of the step and the permeate is recovered;

another step in which a lignosulfonate-containing fraction at least partly derived from the spent sulfite cooking liquor is subjected to filtration at a pressure, flow rate and temperature using a membrane having a cut-off of 1-20 kD (low cut-off) at the pressure, flow rate and temperature of the another step and the retentate is recovered;

wherein the spent sulfite cooking liquor is preheated to about 85-140° C. and the temperature is maintained throughout the filtration steps; and the spent sulfite cooking liquor that has been subjected to the two steps is concentrated by removal of water.

2. Process according to claim 1, in which the concentrated material is spray-dried to produce a powder which has a dry matter content of more than 90%.

3. Process according to claim 1, in which solid contaminants derived from the spent sulfite cooking liquor are removed before the membrane filtration steps.

4. Process according to claim 1, in which the temperature in the steps is 95-140° C.

5. Process according to claim 1, in which the lignosulfonate-containing fraction subjected to the filtration using the low cut-off membrane is the permeate of the filtration using the high cut-off membrane.

6. A method of improving the strength of paper, comprising adding a lignosulfonate-containing product derived from spent sulfite cooking liquor, wherein the spent sulfite cooking liquor is subjected to membrane filtration and wherein the temperature of the liquor is maintained throughout filtration at a temperature of about 85-140° C., the product comprising less than 4 wt. % sulfate ($SO_4^{2-}$) based on dry material obtained, wherein less than 4 wt. % of the lignosulfonate molecules in the product have a molecular weight of more than 60 kD and the amount of resins is below 1 wt. % based on dry material, to paper as a strength-improving agent.

* * * * *

UNITED STATES PATENT AND TRADEMARK OFFICE
CERTIFICATE OF CORRECTION

PATENT NO. : 9,447,131 B2  
APPLICATION NO. : 13/516258  
DATED : September 20, 2016  
INVENTOR(S) : Joensson et al.

Page 1 of 1

It is certified that error appears in the above-identified patent and that said Letters Patent is hereby corrected as shown below:

On the Title Page

Item (30), Foreign Application Data:
Please correct "0901569" to read -- 0901569-4 --

Signed and Sealed this
Twenty-third Day of May, 2017

Michelle K. Lee
*Director of the United States Patent and Trademark Office*